Dec. 23, 1969  K. H. BRUNNER  3,485,185

DOUGH KNOT FORMING MACHINE AND PROCESS

Filed Jan. 15, 1968  7 Sheets-Sheet 1

Fig. 1.

INVENTOR.
KARL H. BRUNNER
BY John A. Harvey
ATTORNEY

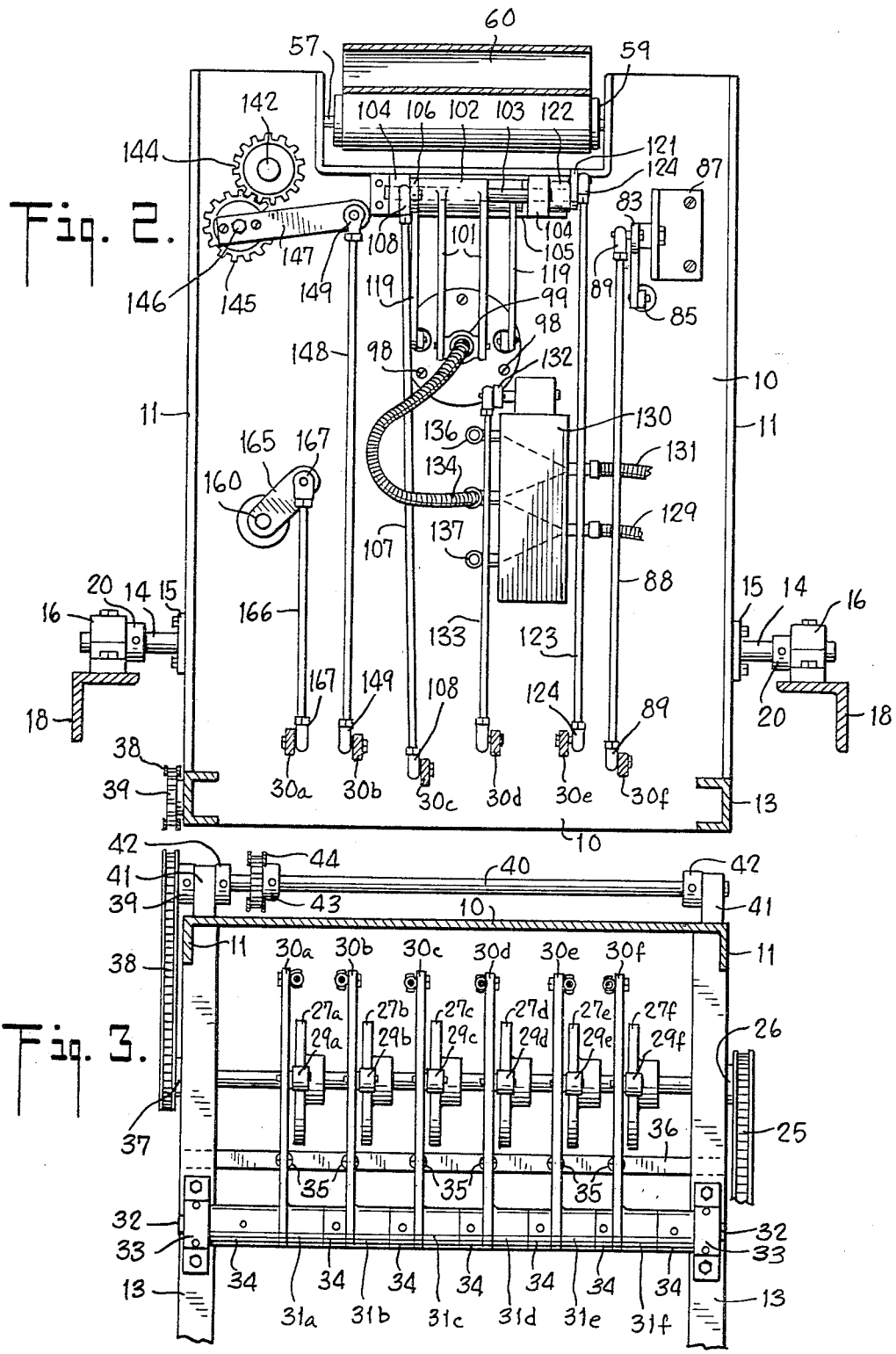

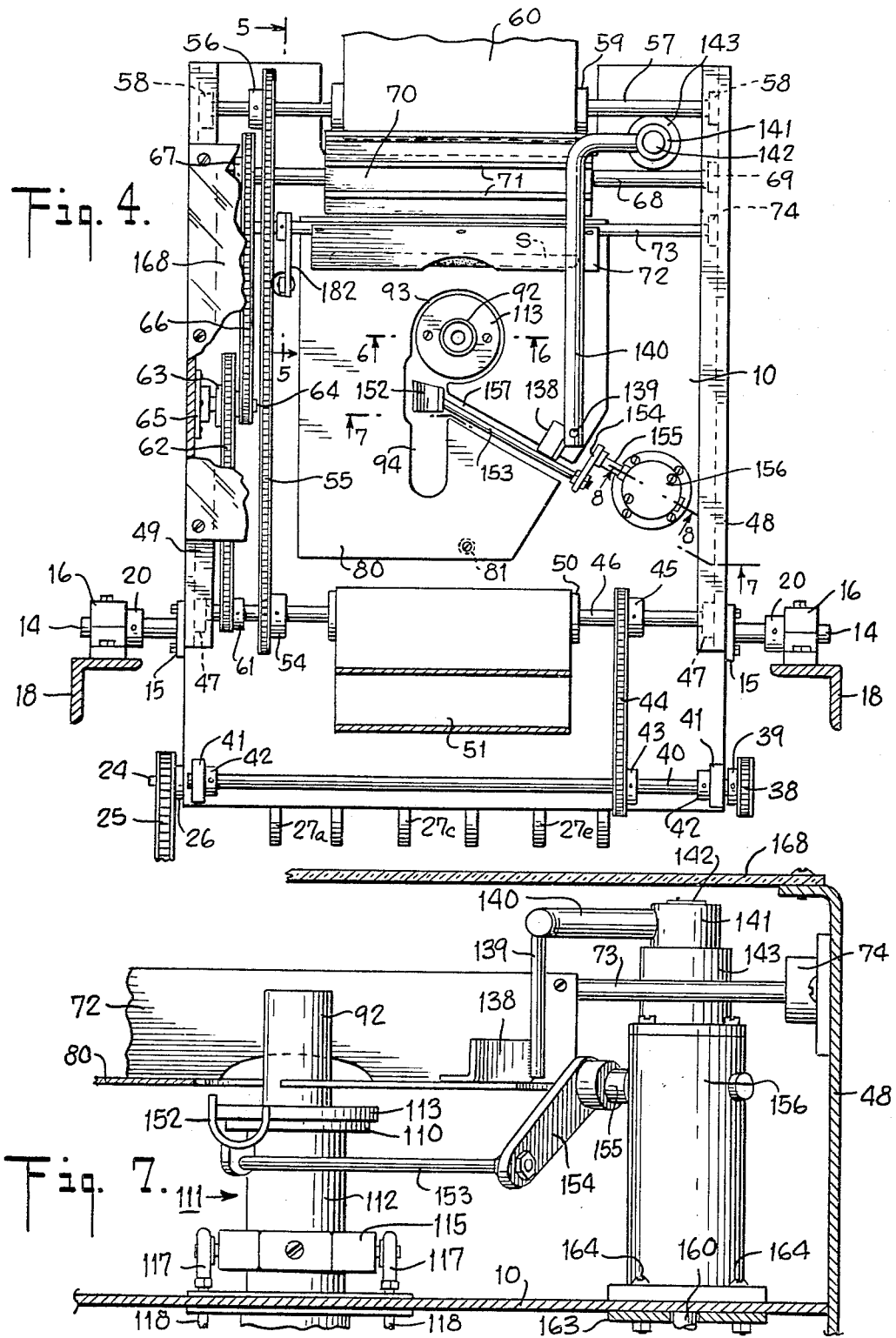

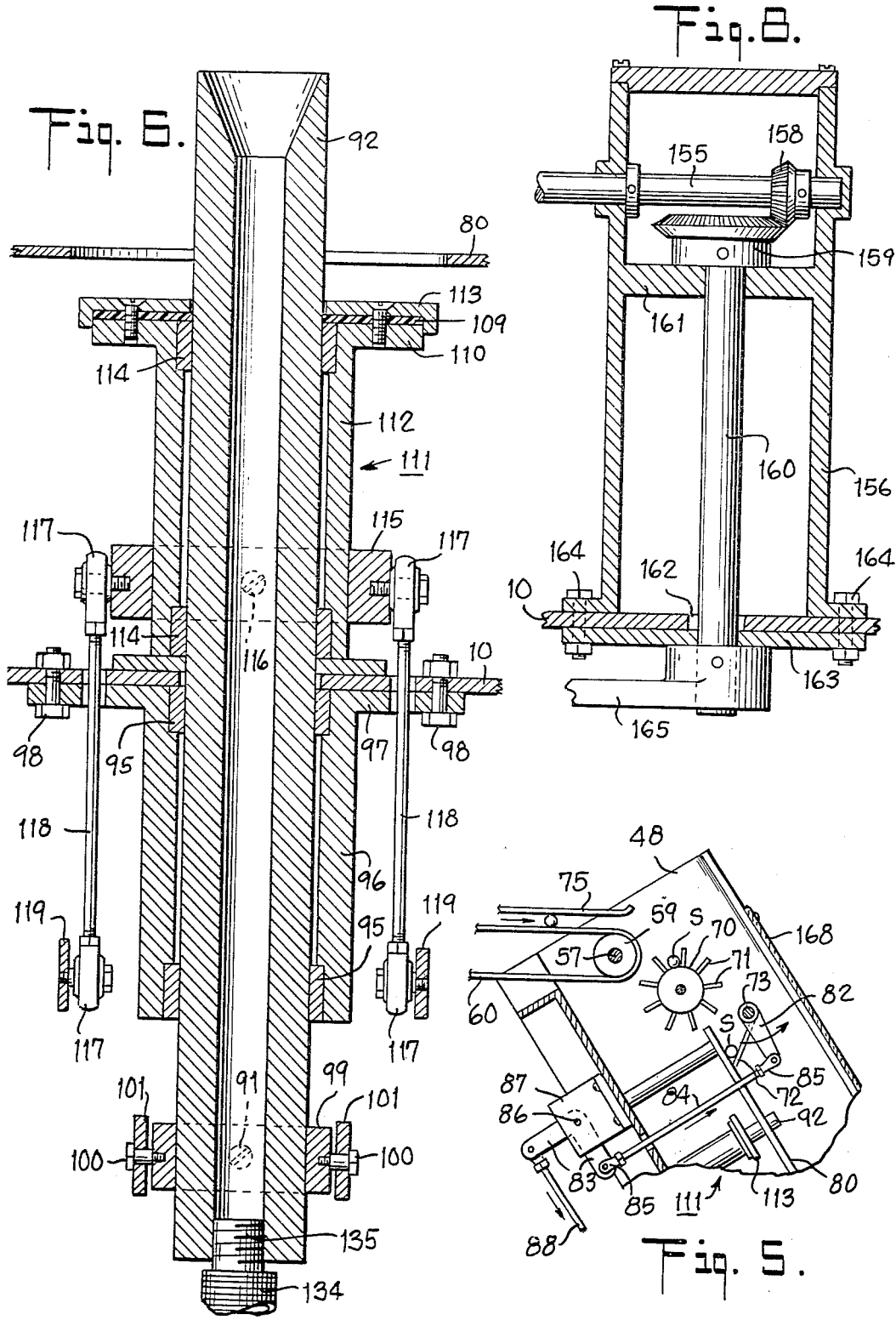

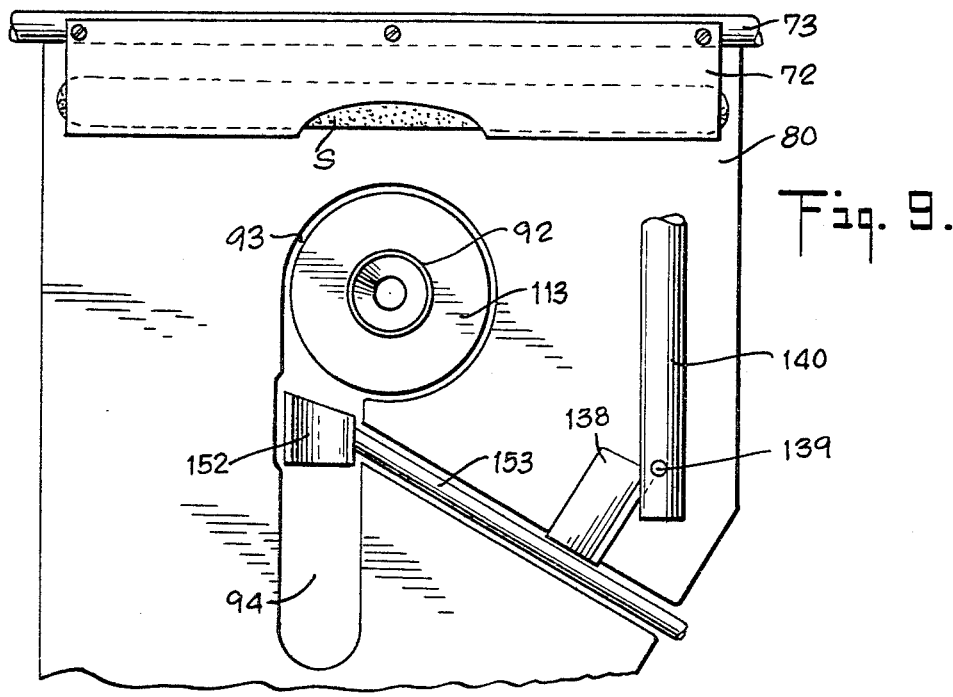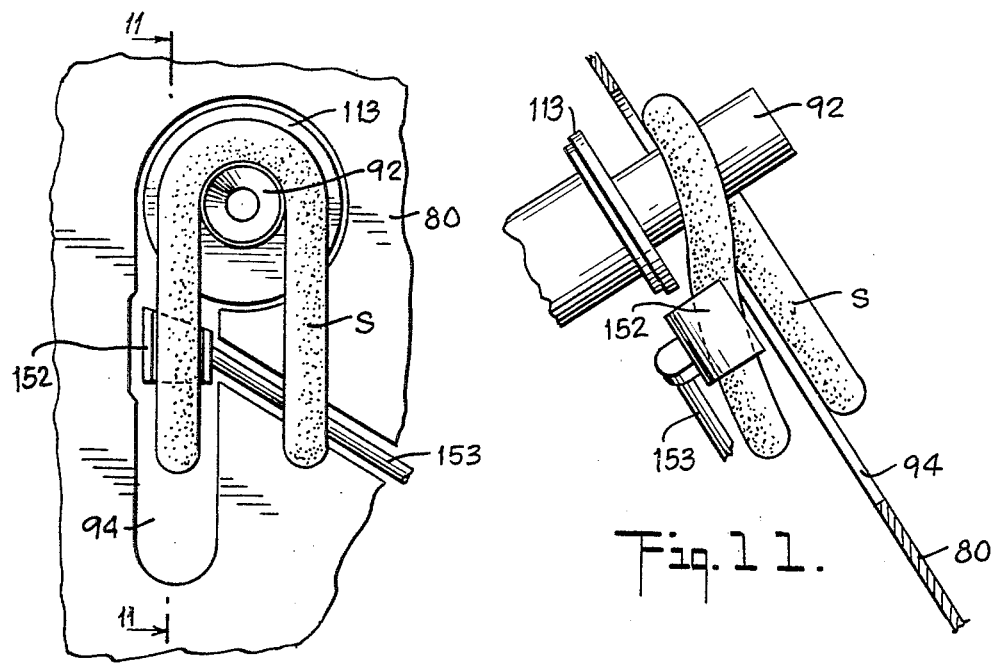

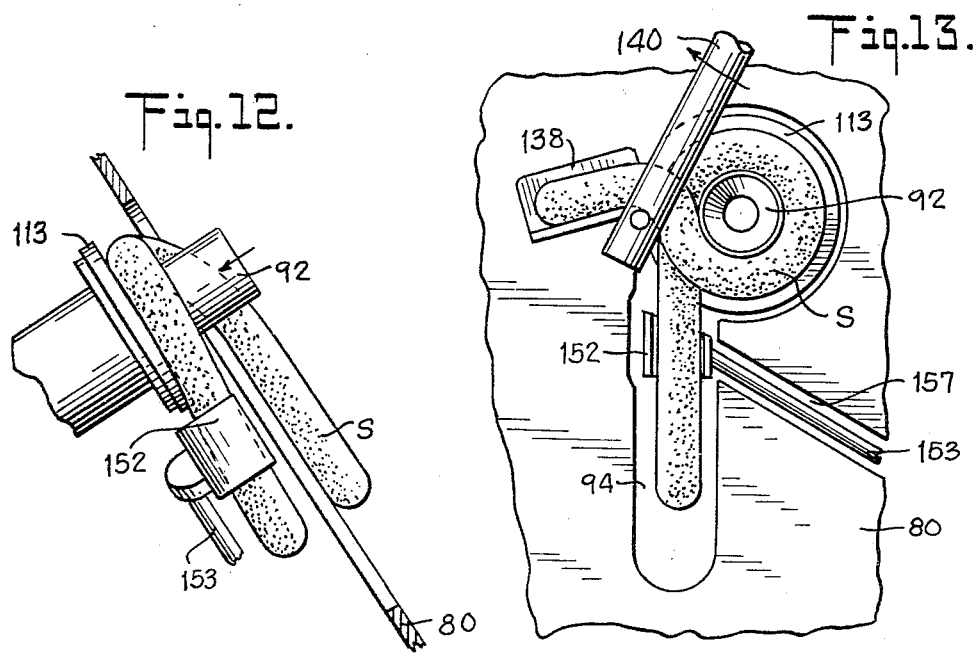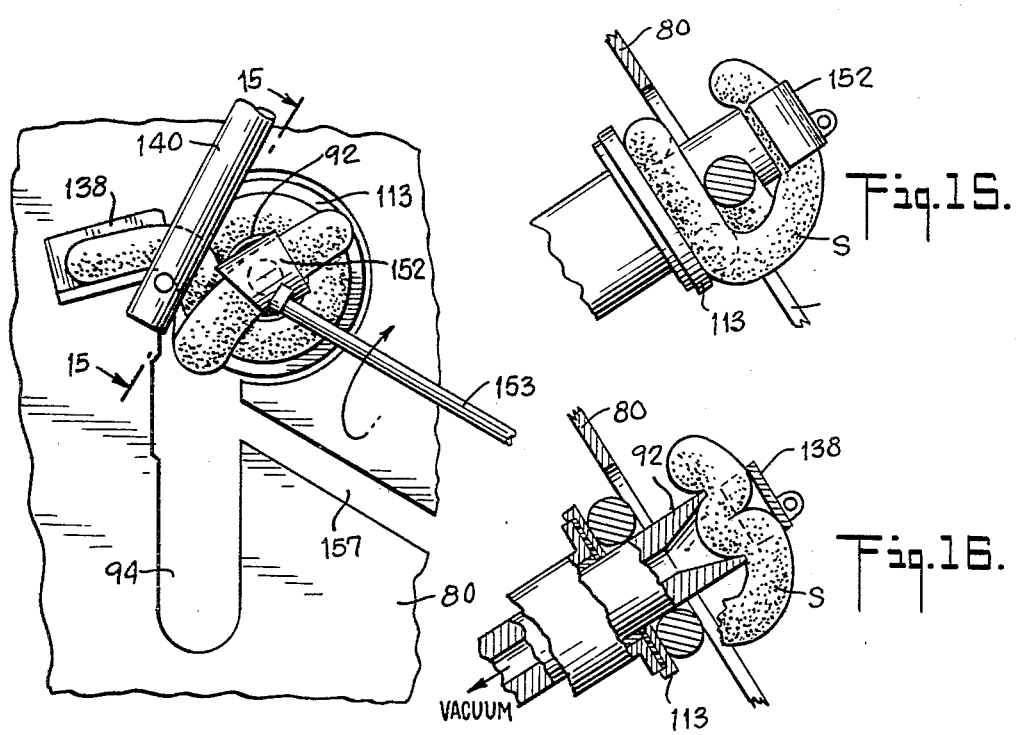

United States Patent Office 3,485,185
Patented Dec. 23, 1969

3,485,185
DOUGH KNOT FORMING MACHINE
AND PROCESS
Karl H. Brunner, 1615 76th St.,
North Bergen, N.J. 07047
Filed Jan. 15, 1968, Ser. No. 697,986
Int. Cl. A21c 3/00
U.S. Cl. 107—9
16 Claims

ABSTRACT OF THE DISCLOSURE

A hollow pin projecting from an inclined surface, axially of the circular portion of a P-shaped aperture in the surface, intercepts a dough string moving under gravity down the table and disposes the same in a U-shape with one leg aligned with the leg of the P-shaped aperture. Two movable members, one initially positioned below the leg of the P-shaped aperture and the other positioned to the right of the first member above the surface, cooperate with the hollow pin which is connected alternately to sources of vacuum and high pressure, to form the dough string into a knot of dough. Auxiliary structure is provided to carry a plurality of dough strings in succession to the inclined surface.

---

The present invention relates to machines for bakeries and particularly to a machine for automatically forming dough knots suitable for placing in a baking oven for production of bakery knot rolls.

It is an object of the present invention to provide a novel dough knot forming machine and method which enables the consistent and rapid automatic fabrication at relatively low cost of dough knots in a form suitable to be baked in an oven in the production of bakery knot rolls.

It is a further object of the invention to provide a dough knot forming machine and method which dispenses with or minimizes all hand manipulations heretofore necessary in fabricating dough knots preparatory to oven baking in the production of bakery knot rolls.

It is an additional object of the invention to provide a new dough knot forming machine which is adapted to fabricate inexpensively and continuously and by entirely automatic operation, at high fabrication rates, dough knots of consistently uniform size and weight suitable to be loaded into bakery pans or to be conveyed through a baking oven to produce baked knot rolls.

Other objects and advantages of the invention will appear as the detailed description thereof proceeds in the light of the drawings forming a part of this application, and in which:

FIG. 1 illustrates in side elevational view a dough knot forming machine embodying the present invention in a particular form;

FIG. 2 illustrates in rear elevational view, FIG. 3 in end view, and FIG. in front elevational view the construction of machine drive and cycle timing structures;

FIG. 5 is a fragmentary side elevational view illustrating the construction and actuation of a dough string releasing gate structure used in the FIG. 1 machine;

FIG. 6 is a cross-sectional view illustrating the construction and certain actuating mechanisms of a hollow pin and platform structure used in the machine herein described;

FIGS. 7 and 8 illustrate the construction and certain actuating structures of a tying finger structure used in the machine; and FIGS. 9–22 illustrate certain operational steps of the machine in effecting the fabrication of dough knots, and are used as an aid in explaining the operation of the machine.

Figure 17:
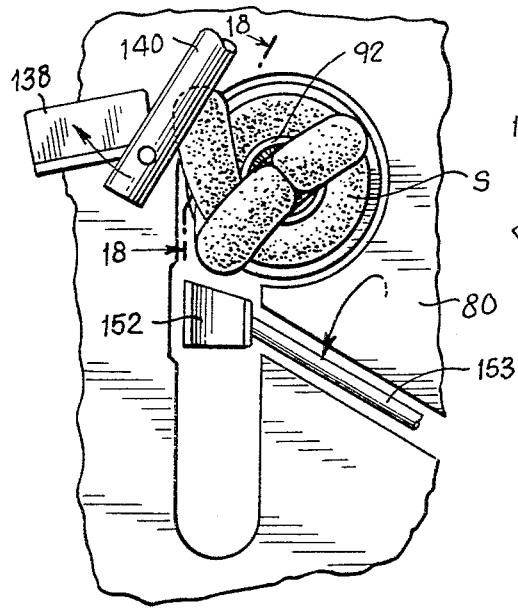

Referring now more particularly to FIGS. 1–4 of the drawings, which illustrate a dough knot forming machine embodying the present invention in a particular form, the machine is fabricated upon a steel base plate 10 having peripheral edge stiffening flanges 11. Integrally fabricated with and at the lower edge of the flanged base plate 10 is a right-angled projecting open-box rectangular frame 12 comprised of integrally joined side and end structural steel members 13 of U-shaped cross-sectional configuration as shown. As also shown more clearly in FIGS. 1 and 2, axially aligned studs 14 are secured by integral base flanges 15 on the side flanges 11 of the base plate 10 and are received in trunnions 16 secured to the top of side members of an open-box frame bed structure 17 comprised of integrally joined structural steel members 18 of L-shaped cross-sectional configuration. This pivotal support of the flanged base plate 10 upon the bed structure 17 permits adjustment of the slope of the base plate to a desired angle, preferably of the order of 60°, to be horizontal at which adjusted position it is retained by a turn buckle 19 which is connected between the end structural member of the rectangular frame 12 and the bed structure 17. A collar 20 is adjustably secured longitudinally of each of the studs 14 to locate the position of the base plate structure 10 between the trunnions 16 of the bed structure 17.

An electric motor 23 with integral gear reduction drive structure is supported upon a support plate (not shown) secured between the side members 13 of the rectangular frame 12 and is mechanically connected to drive a cam shaft 24 through a sprocket drive chain 25 and a sprocket wheel 26 secured on the shaft 24. A plurality of machine timing cams 27a–27f are secured on the cam shaft 24 to time certain machine operations in a manner hereinafter described. These cams are engaged by respective cam rollers 28a–28f pivotally supported on respective studs 29a–29f projecting from the sides of respective cam follower arms 30a–30f. The latter are pivotally supported by integral end collars 31a–31f on a shaft 32 which is supported by brackets 33 secured on the side structural steel members 13 of the fram 12. The cam follower arms 30a–30f are positionally located on the shaft 32 by spacer bushings 34, and individual tension springs 35 connect the cam follower arms and a crossbar 36 of the frame 12 to maintain the follower arm rollers in engagement with the cam surface of their associated cams 27a–27f.

The opposite end of the cam shaft 24 has a sprocket wheel 37 secured thereon, and the latter through a sprocket chain 38 drives a sprocket wheel 39 secured on the end of a shaft 40 journaled at each end by trunnions 41 secured on the base plate 10. The shaft 40 is longitudinally positioned by collars 42 abutting the trunnions 41, and drives a sprocket wheel 43 which is mechanically connected through a drive sprocket chain 44 (FIG. 4) to a sprocket wheel 45 secured on a shaft 46 journaled at its ends by bearings 47 secured to edge-flanged and opposing steel side plates 48 and 49 mounted on the side edges of the base plate 10 as shown. The shaft 46 has affixed thereon the drive roller 50 of a discharge conveyor belt 51 supported at its opposite end by an idler roller (not shown). A further sprocket wheel 54 secured on the shaft 46 is mechanically connected through a drive sprocket chain 55 to a sprocket wheel 56 secured on a shaft 57 journaled at its ends by bearings 58 secured to the side plates 48 and 49. The shaft 57 has affixed thereon the drive roller 59 of a feed conveyor belt 60 supported at its opposite end by an idler roller (not shown).

The shaft 46 also drivingly carries an additional sprocket wheel 61 which is mechanically coupled by a drive sprocket chain 62 to the larger diameter one of a dual sprocket wheel structure 63 having an integral smaller diameter sprocket wheel to provide a speed reduction drive arrangement. This dual sprocket wheel structure is rotationally supported on a stud shaft 64 secured by a flange 65 on the side plate 49 as shown. The smaller diameter sprocket wheel of the structure 63 is mechanically coupled by a drive sprocket chain 66 to a sprocket wheel 67 secured on a shaft 68 journaled at its ends by bearings 69 secured on the side plates 48 and 49. The shaft 68 drivingly supports a rotatable drum 70 having equally spaced and radially projecting vane members 71 which provide a plurality of elongated, longitudinal, peripheral bins for receiving individual ones of a succession of dough strings supplied on the conveyor belt 60. The rotational drive ratio between the cam shaft 24 and the shafts 57 and 68, effected by the sprocket chain and sprocket-wheel drive of the shafts as just described, is such that the rotatable drum 70 receives one dough string S from the conveyor belt 60 during each machine cycle and prior to each machine cycle releases one dough string S against a planar gate member 72 pivotally supported on a shaft 73 journaled by end bearings 74 secured to the side plates 48 and 49. The spaced dough strings S are supplied to the conveyor belt 60 in the form of dough strips. This may be accomplished manually or by conventional strip-forming equipment (not shown) typified by that used with dough moulding machines. These dough strips are then formed into elongated cylindrical cross-sectional configuration by movement of the conveyor belt 60 past a stationary plate 75 fixedly supported from the base plate 10 by suitable support structures (not shown).

The gate member 72 is normally positioned with its free edge in engagement with the surface of a table member 80 which is supported in spaced relation to the base plate 10 by a plurality of pedestals 81. The base plate 10 and table member 80 are preferably adjusted to and retained by the turn buckle 19 at an angle of approximately 60° from the horizontal so that dough strings S released by the drum 70 and gate member 72 slide by gravitational force across the table surface.

Each machine cycle is initiated by pivotal motion of the gate member 72 to release a dough string S for sliding traversal of the surface of the table member 80. This pivotal motion of the gate members 72 is accomplished in a manner shown more clearly in FIGS. 2, 4 and 5 and includes an arm 82 secured on the shaft 73. This arm is connected to one arm of a bell crank 83 by a rod link member 84 having end swivel connectors 85. The bell crank 83 is pivotally supported by a stud 86 of an L-shaped bracket 87 secured to the base plate 10 as shown. The other arm of the bell crank 83 is mechanically connected to the cam follower arm 30f by a rod link member 88 having end swivel connectors 89. The cam arm 30f is so actuated by its asosciated tension spring 35 under control of the cam 27f as to initiate each machine cycle by pivoting the planar gate member 72 away from the surface of the table member 80 to release a dough string as earlier mentioned, the planar gate member 72 being then imediately pivotally moved in opposite direction to close the gate and restrain the next dough string released by the rotatable drum 70. By thus immediately closing the gate member 72, the timed rotational operation of the drum 70 need not be quite as accurate as might otherwise be required, thus permitting rotation of the drum 70 for example at approximately three revolutions per minute to fabricate approximately twenty-seven successive dough knots per minute.

Each dough string S released by the gate member 72 slides sidewise by gravity down the surface of the table member 80 to engage a hollow pin 92 which projects through and above the table surface in concentric relation to the enlarged circular body portion 93 of a p-shaped aperture provided in the table member and having a leg portion 94 extending approximately normal to and in the direction of movement of the dough strings across the table. Each dough string S engages the hollow pin 92 at approximately the center of the string, and the ends of the string continue to slide down the table surface to form a string of U-shaped configuration about the hollow pin 92. One leg of the formed string rests upon the table surface, and the other leg lies below the table surface in the leg 94 of the table aperture. The preferred 60° angle of the table surface from the horizontal causes the ends of the dough string to be effectively critically damped by friction with the table surface during their movement into U-shaped configuration. Thus if the table surface is positioned at a larger angle than 60° from the horizontal, the ends of the dough string tend to oscillate about the desired U-shaped configuration and this condition would accordingly require a somewhat longer machine cycle in order to permit the dough string ends to halt their oscillatory movement. Positioning of the table surface at a lesser angle than 60° to the horizontal increases the amount of frictional engagement of the dough string with the table surface and tends to cause the string to roll rather than slide down the latter until engaged by the hollow pin 92 after which the ends of the string would tend not to form into a good U-shaped configuration and might need manual or other machine provision to overcome this tendency.

As shown more clearly in FIGS. 2 and 6, the hollow pin 92 is supported for longitudinal reciprocal motion by ring bearing sleeves 95 retained in the ends of a hollow cylindrical sleeve 96 having an end flange 97 by which it is secured by machine screws 98 to the base plate 10. Imediately after the dough string has been formed into U-shaped configuration about the hollow pin 92 as just described, the latter is moved downwardly (as seen in FIG. 6) by mechanical actuation under control of the cam 27c. To this end, a sleeve 99 is secured by a set screw 91 on the lower end of the hollow pin 92 and is pivotally connected by shouldered machine screws 100 to short longitudinal slots (not shown for simplicity) provided in spaced arms 101 of a U-shaped yoke structure 102 pivoted on a shaft 103 supported between the arms 104 of a U-shaped bracket 105 secured to the base plate 10. The U-shaped yoke structure 102 includes an arm 106 which is connected to the cam follower arm 30c by a link rod member 107 having end swivel connectors 108. This downward movement (as seen in FIG. 6) of the hollow pin 92 is effected by the tension spring 35 associated with the cam follower arm 30c and under control of the cam 27c, and near the end of the machine cycle the contour of the cam 27c raises the hollow pin 92 upwardly to the initial position which it occupies at the outset of the machine cycle.

The downward motion of the hollow pin 92 just described moves the curvilinear base portion of the formed U-shaped dough string into engagement with a tying platform structure 111. The latter is fabricated of a hollow cylindrical body portion 112 having an end radial tying platform flange 113 secured with an intervening Teflon resilient washer 109 on an integral body flange 110. The body portion 112 is provided with internal end sleeve bearings 114 by which the tying platform structure 111 is slidably supported for reciprocal motion on the external cylindrical surface of the hollow pin 92. The resilient washer 109, by cleaning action performed on the surface of the pin 92, guards against entry of flour and dough particles into the uppermost sleeve bearing 114. The tying platform flange 113 is positioned below the surface of the table member 80 at the initiation of a machine cycle, and during the machine cycle the tying platform structure 111 is moved upwardly (as seen in FIG. 6) to position the uppermost surface of the platform flange 113 approximately at or slightly beyond the end of the hollow pin 92. Thereafter and prior to the end of the machine cycle, the tying platform structure 111 is returned to its initial position shown in FIG. 6. This reciprocal motion of the tying platform structure 111 is accomplished by a collar 115 which is secured by a set screw 116 on the lower end of the cylindrical body portion 112 and is mechanically connected by swivel end connectors 117 and intermediate tie rod members 118 to spaced arms 119 secured on a shaft 120 (FIG. 1) journaled between the arms 104 of the U-shaped bracket 105. An arm 121 having an integral support hub 122 is also secured on the shaft 120 and is mechanically connected to the cam follower arm 30e by a link rod member 123 having end swivel connectors 124. The reciprocal motion of the tying platform structure 111 is accordingly effected by the tension spring associated with the follower arm 30e and is controlled by the contour of the cam 27e.

Prior to movement of the tying platform structure 111 to position its platform flange 113 approximately at or slightly beyond the end of the hollow pin 92 as just described, negative air pressure is impressed on the hollow interior of the latter. Just prior to return of the tying platform structure 111 to its initial position, positive air pressure is impressed on the hollow interior of the pin 92. These negative and positive air pressures are supplied by a vacuum pump 127 (FIG. 1) which is driven by an electric motor 128 supported upon a platform (not shown) extending between the side structural steel members 13 of the rectangular frame 12. The negative air intake (vacuum) port of the pump 127 is coupled through a flexible hose 129 to a first input port of a conventional four-way directional control valve 130, and the air discharge or exit port of the pump 127 is coupled through a flexible hose 131 to a second input port of the valve 130. The latter has a valve control arm 132 which is mechanically connected to the cam follower arm 30d through a link rod member 133, the associated cam 27d thus controlling the operation of the directional control valve 130. This control is such that the valve 130 at any time either applies the negative air pressure of the hose 129 to a flexible hose 134, coupled by a screw-threaded nipple 135 (FIG. 6) to the hollow interior of the pin 92, while at the same time discharging the air pressure of the hose 131 to an air discharge port 136 of the valve 130 or alternatively applies the positive air pressure of the hose 131 to the hose 134 while concurrently relieving the negative air pressure of the hose 129 by coupling the latter to an air intake port 137 of the valve 130.

After the hollow pin 92 has been moved downwardly to place the curvilinear base portion of the formed dough string of U-shaped configuration upon the platform flange 113 of the tying platform structure 111, the right-hand leg of the dough string which rests upon the surface of the table member 80 is crossed over the left-hand leg which rests below the table member 80 in the elongated aperture 94 thereof. This is accomplished by a spatula-like member 138 which slidably engages the surface of the table member 80 and is moved in an arcuate path spaced in relation to the pin 92 and which while moving supportedly engages and moves the right-hand leg of the dough string across the aperture leg 94 and into crossed relation with the dough string left-hand leg lying in the latter. For this purpose, the spatula-like member 138 is supported by a pedestal 139 (FIG. 1) at the free end of a tying arm 140 which itself is supported for angular motion parallel to the table member 80 by an integral collar 141 (FIG. 4) secured on a shaft 142 journaled by a bearing member 143 secured to the base plate 10. As shown more clearly in FIG. 2, the shaft 142 extends through an aperture of the base plate 10 and has a pinion gear 144 secured on the end thereof. The latter has meshing engagement with a pinion gear 145 which is rotationally supported by a shouldered screw 146 on the base plate 10 and carries an arm 147 mechanically connected to the cam follower arm 30b by a link rod member 148 having end swivel connectors 149. The tension spring 35 associated with the cam follower arm 30b operates through the pinion gears 144 and 145 to actuate the tying arm 140 and spatula-like member 138, under control of the surface contour of the cam 27b, through successive major and minor steps of angular motion in a forward direction. The major step of this motion crosses the legs of the U-shaped dough string, and the minor step moves the tying arm 140 and spatula-like member 138 to a further position where they do not interfere with removal of a formed dough knot from the tying platform flange 113. Thereafter, the tying arm 140 and spatula-like member 138 are moved in a continuous angular motion in reverse direction to the position which they occupy at the beginning of a machine cycle of operation.

The left-hand leg of the formed dough string of U-shaped configuration after falling below the surface of the table member 80 through the aperture leg 94 thereof is supported by a U-shaped yoke 152 affixed to the end of a tying finger member 153 supported at one end of an arm 154 having its other end secured on the end of a shaft 155 journalled by diametrically opposing wall portions of a housing 156. The table member 80 is provided with a narrow elongated table-surface slot 157 extending at an acute angle to and intersecting the aperture leg 94 to permit the typing finger 153 to be moved by the shaft 155 through an arcuate path extending from a position below the table member 80 to a position above the latter. The shaft 155 is so positioned that the axis of this motion lies approximately in the plane of the table surface and projects to one side of the pin 92. This movement is accomplished after the legs of the formed dough string have been crossed by operation of the tying arm 140 as last described, and is effective to place the left-hand leg of the dough string as supported by the yoke 152 across the end of the hollow pin 92 where it is retained by the negative air pressure impressed on the hollow interior of the latter as above-described. Thereafter the tying finger 153 returns in a reverse arcuate direction to its initial position below the table member 80. This reciprocal motion of the tying finger 153 is accomplished by a structure shown more clearly in FIGS. 7 and 8 and which includes a beveled pinion gear 158 secured on the shaft 155 and having meshing engagement with a beveled gear 159 secured on a shaft 160 journaled coaxially of the housing 156 by an interior transverse wall 161 thereof. The shaft 160 extends through an aperture 162 of the base plate 10 and is journaled near its lower end by a bearing plate 163 secured with the housing 156 to the base plate 10 by machine screws 164. An arm 165 is secured on the lower end of the shaft 160 and, as shown more clearly in FIG. 2, is connected to the cam follower arm 30a by a link rod member 166 having end swivel connectors 167. The reciprocal arcuate motion of the tying finger 153 is thus effected by the tension spring 35 associated with the cam follower arm 30a and the range and machine timing of this motion is under control of the cam 27a.

After a dough knot has been formed in a manner presently to be described more fully, the positive air pressure introduced interiorly of the hollow pin 92 ejects it from the tying platform 113 onto the table member 80 and it then slides by gravitational force down the surface of the table member and onto the conveyor belt 51. For more forceable ejection of the formed dough knot from the tying platform 113 if desired, the positive air pressure introduced exteriorly of the hollow pin 92 may be sufficiently large as to discharge the formed dough knot against a transparent window pane 168 of Plexiglas or the like material secured to the upper flanged edges of the side plates 48 and 49, and from which pane the formed dough knot is deflected and falls by gravity onto the lower edge of the table member 80 or directly onto the conveyor belt 51.

FIGS. 10–22 illustrate successive steps in the fabrication of a dough knot during each machine cycle, and are used as an aid to a more complete understanding of the machine operation. These figure illustrations will now be considered in turn.

FIG. 9 illustrates the positioning of the dough knot forming components of the machine just prior to each initiation of a cycle of machine operation. The gate member 72 engages the surface of the table member 80 and retains an elongated dough string S in readiness to slide by force of gravity across the table surface when the gate member 72 pivots away from the later to initiate a machine cycle of operation.

FIGS. 10 and 11 illustrate a dough string S formed with U-shaped configuration after the release of the dough string by the gate member 72 and the engagement of the released string with the hollow pin 92. The right-hand leg (as seen in FIG. 10) of the formed dough string rests upon the surface of the table member 80 whereas the left-hand leg of the formed string has dropped through the aperture leg 94 of the table member 80 and is supported by the yoke 152 of the tying finger 153. As illustrated in FIG. 11, the curvilinear base portion of the U-shaped string S retains its position of engagement with the hollow pin 92 spaced from the tying platform 113.

The hollow pin 92 is now moved downwardly to move the base portion of the U-shaped dough string into engagement with the tying platform 113 as illustrated in FIG. 12.

As illustrated in FIG. 13, the tying arm 140 with its spatula-like member 138 is now moved in forward direction through the major step of its angular motion to cross the right-hand leg of the dough string S over the left-hand leg and further wrap the dough string about the hollow pin 92.

This forming step is followed by arcuate motion of the tying finger 153 to lift the left-hand leg of the dough string and place it across the end of the hollow pin 92 as illustrated in FIGS. 14 and 15. The negative air pressure impressed interiorly of the hollow pin 92 at this time holds the dough string and pulls it partially into the flared-end hollow interior of the pin as illustrated in FIG. 16.

Figure 18:
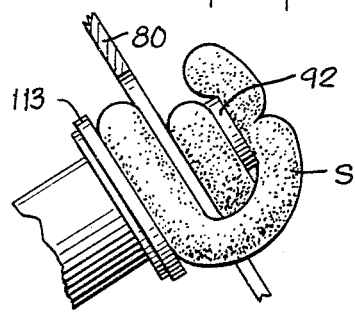

The tying arm 140 now moves in forward direction through its minor step of angular motion to displace the tying arm farther from the dough string as thus formed, and the tying finger returns by arcuate motion to its initial position below the surface of the table member 80 as illustrated in FIG. 17. FIG. 18 illustrates the configuration of the dough string S at this time.

Figure 19:
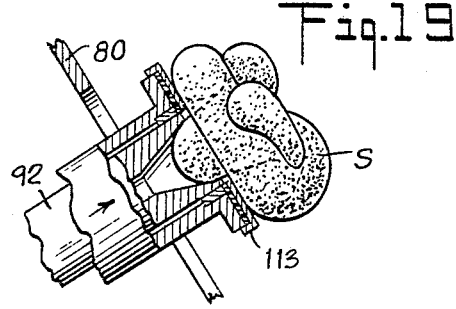

The tying platform 113 is now raised approximately to or slightly beyond the end of the hollow pin 92 as illustrated in FIG. 19, and the negative air pressure maintained interiorly of the pin 92 retains the left-hand leg of the string stationary while the tying platform 113 pushes the now-circular body of the string upwardly thus effectively completing the fabrication of the tied dough knot.

Figure 20:
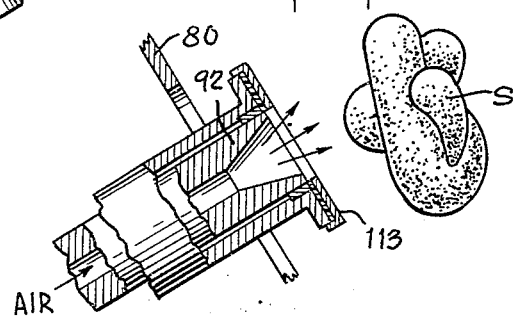
Figure 21:
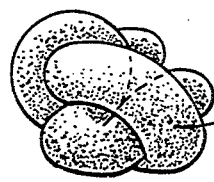

Positive air pressure is now introduced interiorly of the hollow pin 92 to eject the formed dough knot from the tying platform 113 as illustrated in FIG. 20, and the formed and thus ejected dough knot then falls by gravity onto the surface of the table member 80 and slides onto the conveyor belt 51 which conveys it to a baking pan for ultimate baking into baked knot rolls. FIG. 21 illustrates the configuration of the formed dough knot S thus fabricated.

Figure 22:
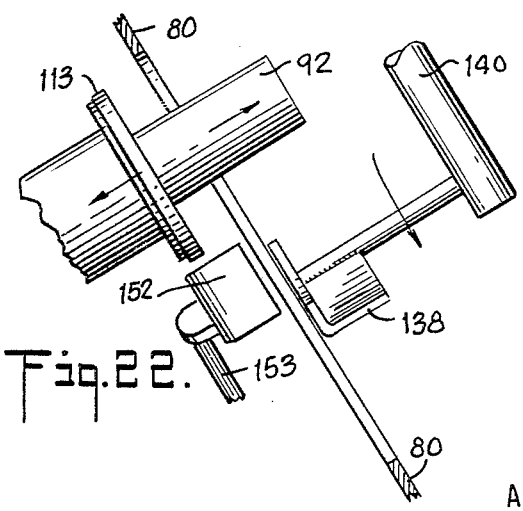

After ejection of the formed dough knot from the tying platform 113 as last described, the tying arm 140 with its spatula-like member 138 returns to the initial position which it occupied at the outset of the machine cycle, and the hollow pin 92 and tying platform 113 are respectively raised and lowered to the initial positions which these components occupied at the outset of the machine cycle all as indicated by the arrows in the illustration of FIG. 22. These return movements of these components complete the machine cycle and place the machine in readiness to initiate a further machine cycle upon raising of the gate member 72 to release a further dough string S as earlier described.

It will be apparent from the foregoing description of the invention that a machine embodying the invention enables the consistent and rapid automatic fabrication of dough knots in a form suitable to be baked in an oven in the production of bakery knot rolls. A machine embodying the invention has the further advantages that it dispenses with or minimizes all hand manipulations heretofore necessary in fabricating such dough knots preparatory to oven baking, and is adapted to fabricate such dough knots inexpensively and continuously and entirely automatically at high fabrication rates yet with consistently uniform size and weight.

What is claimed is:

1. A dough knot machine comprising a table member having a table surface and a P-shaped surface aperture oriented with the leg thereof approximately normal to and extending in the direction of movement of elongated dough strings traversing said surface, a hollow pin and a tying platform coaxially supported and coaxially positioned in relation to the enlarged body portion of said aperture with said platform normally occupying a first position below but movable to a second position above said table surface and with said pin projecting above said table surface to intercept and form each moving dough string into a U-shaped configuration having one leg thereof disposed below said table surface in the leg of said aperture, means including a spatula-like member slidably engaging said table surface and reciprocally movable in forward and backward directions thereacross along a path spaced in relation to said pin for supportably engaging and moving the other leg of said formed dough string across that aperture and into crossed relation with said one leg, a tying finger having a yoke portion and means operable upon substantial completion of movement of said spatula-like member in said forward direction for reciprocally moving said tying finger to move said yoke portion along an arcuate path extending through said aperture from a first position below said table surface at which said yoke portion supports said one leg of said formed dough string to a second position at which an end region of said one dough leg is placed by said yoke portion upon the end of said pin and retained thereon by negative air pressure introduced interiorly of said pin while said yoke portion of sad tying finger is returned to said first position thereof, and means operative upon completion of motion of said spatula-like member in said forward direction for moving said tying platform from said first to said second platform position to complete fabrication of a knot of dough accmpanied by ejection of said dough knot from said pin and platform and onto said table surface by positive air pressure introduced interiorly of said pin and for returning said platform to said first position thereof during completion of return of said spatula-like member in said backward direction thereof.

2. A dough knot forming machine according to claim 1 wherein said table surface is planar and said tying platform is circular and concentrically positioned in relation to the circular body portion of said aperture and at least partially supports the curvilinear base portion of said formed dough string.

3. A dough knot forming machine according to claim 1 wherein said spatula-like member is supported upon and depends from the end of an arm pivoted for angular motion parallel to said table surface to move said spatula-like member along an arcuate path on said table surface.

4. A dough knot forming machine according to claim 1 wherein said spatula-like member is reciprocally movable in successive major and minor steps in said forward direction and by continuous movement in said backward direction, wherein said tying finger begins said reciprocal movement thereof upon substantial completion of said major step of movement of said spatula-like member in said forward direction, and wherein said tying platform is moved from said first to said second position thereof upon substantial completion of said minor step of motion of said spatula-like member in said forward direction.

5. A dough knot forming machine according to claim 1 which includes means operating in timed relation to interception of said dough string by said hollow pin for axially moving said pin toward said tying platform to deposit the curvilinear base portion of said formed dough string on said tying platform and for subsequently reversely axially moving said hollow pin to the initial position thereof concurrently with said return movement of said tying platform to said first position thereof.

6. A dough knot forming machine according to claim 1 wherein said table surface is provided with a narrow elongated table-surface slot extending at an acute angle to and intersecting said aperture leg and wherein said tying finger is supported on an arm for arcuate reciprocal motion through said slot.

7. A dough knot forming machine according to claim 6 wherein the axis of arcuate motion of said tying finger lies approximately in the plane of said table surface and projects to one side of said hollow pin.

8. A dough knot forming machine according to claim 1 wherein said table member is supported with its table surface forming an angle to a horizontal plane to permit dough string traversal of said surface by the pull of gravitational force exerted thereon.

9. A dough knot forming machine according to claim 8 wherein said table member is supported with its table surface forming an angle of approximately 60° to a horizontal plane.

10. A dough knot forming machine according to claim 8 wherein there is provided means including a gate member for periodically releasing dough strings to move by gravity across said table surface.

11. A dough knot forming machine according to claim 10 wherein said dough string release means further includes a rotatable drum having elongated longitudinal peripheral bins for receiving a succession of dough strings and releasing them one at a time to said gate member.

12. A dough knot forming machine according to claim 10 wherein said means including a spatula-like member operates in delayed time relation to release of each said dough string by said gate member.

13. A dough knot forming machine according to claim 12 wherein said machine includes a plurality of cams supported upon a common shaft for rotation in unison through a complete cam-cycle control angular revolution establishing each of successive machine cycles, and wherein all of said means are cyclically controlled within said machine cycle by individual cam followers engaging individual ones of said cams.

14. A dough knot forming machine according to claim 13 wherein a complete cam-cycle control angular revolution of said cams is comprised by a 360° rotation thereof.

15. The method of forming dough knots comprising the steps of releasing elongated dough strings to slide sidewise by gravity across a sloping surface and into engagement with a pin projecting above said surface thereby to form each string into U-shaped longitudinal configuration, permitting one leg of said formed string to drop below said surface and into supporting engagement with a support tying member, moving the other leg of said formed string into crossed relation with said one leg, raising said one leg over said other leg and depositing an end portion of said one leg on said pin by guided arcuate motion of said tying member, retaining said end portion of said one leg on the end of said pin and moving the formed dough string longitudinally of said pin to releasable relation at said one end thereof to complete the forming of said dough knot, and terminating the retention on said end of said pin of said end portion of said one leg to permit release of said formed dough knot past said pin.

16. The method of forming dough knots according to claim 15 wherein said pin is hollow, wherein said end portion of said one leg is retained on the end of said pin by a negative air pressure applied interiorly of said hollow pin, and wherein said termination of retention of said end portion of said one leg on said end of said pin is effected by air pressure change interiorly of said hollow pin from said negative air pressure to a positive air pressure.

References Cited

UNITED STATES PATENTS 2,769,407  11/1956  Allen et al. _____ 107—8

WALTER A. SCHEEL, Primary Examiner

R. I. SMITH, Assistant Examiner

U.S. Cl. X.R.

107—54